April 29, 1924.
E. G. K. ANDERSON
1,491,893
UNIVERSAL LAMP MOUNTING AND ATTACHING MEANS THEREFOR
Filed June 27, 1921.    2 Sheets-Sheet 1
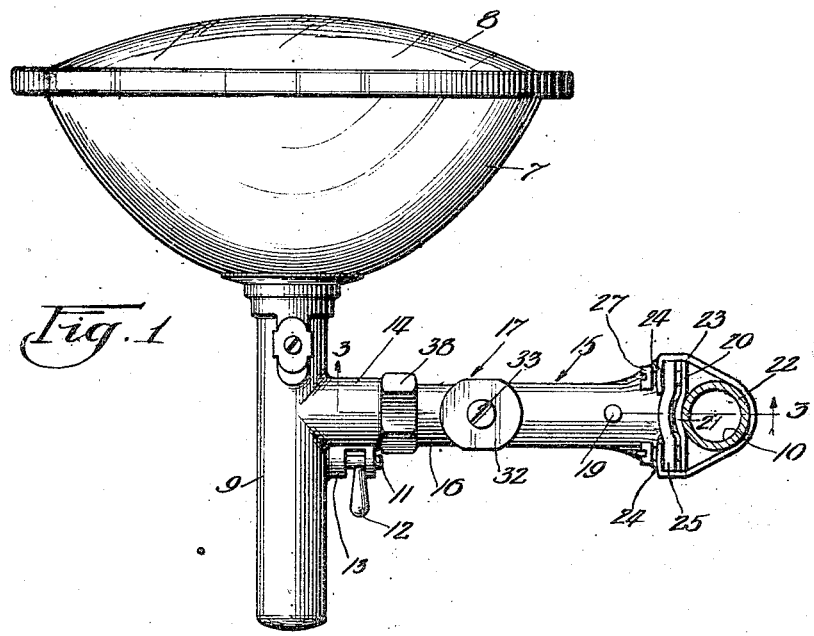
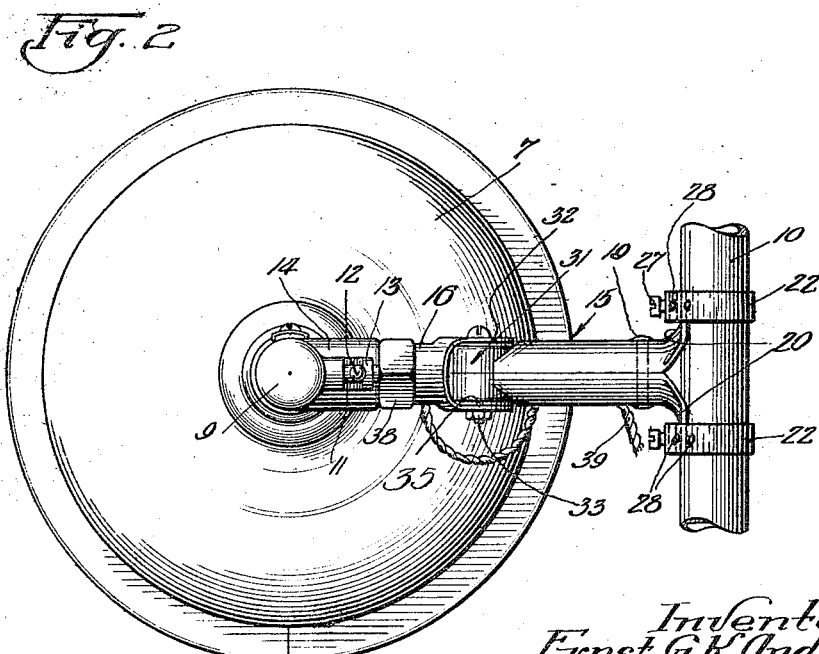
Inventor:
Ernst G. K. Anderson
William L. Hall
Atty.

April 29, 1924.
E. G. K. ANDERSON
1,491,893
UNIVERSAL LAMP MOUNTING AND ATTACHING MEANS THEREFOR
Filed June 27, 1921  2 Sheets-Sheet 2
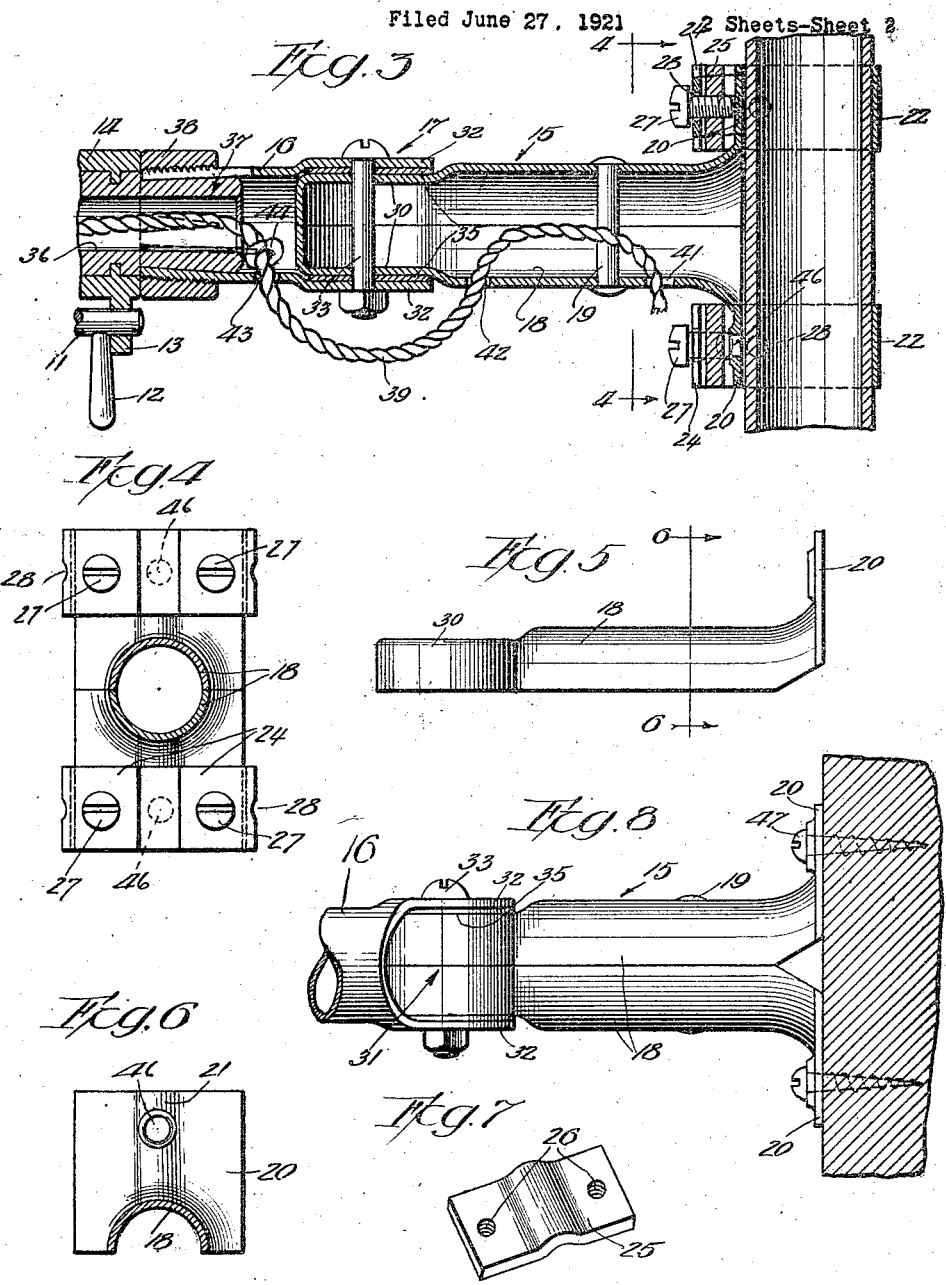
Inventor:
Ernst G. K. Anderson
William H. Hall, Atty.

Patented Apr. 29, 1924.

1,491,893

UNITED STATES PATENT OFFICE.

ERNST G. K. ANDERSON, OF CHICAGO, ILLINOIS, ASSIGNOR, BY MESNE ASSIGNMENTS, TO APPLETON ELECTRIC CO., OF CHICAGO, ILLINOIS, A CORPORATION OF ILLINOIS.

UNIVERSAL LAMP MOUNTING AND ATTACHING MEANS THEREFOR.

Application filed June 27, 1921. Serial No. 480,561.

*To all whom it may concern:*

Be it known that I, ERNST G. K. ANDERSON, a citizen of the United States, and a resident of Chicago, in the county of Cook and State of Illinois, have invented certain new and useful Improvements in Universal Lamp Mountings and Attaching Means Therefor; and I do hereby declare that the following is a full, clear, and exact description thereof, reference being had to the accompanying drawings, and to the characters of reference marked thereon, which form a part of this specification.

This invention relates to improvements in universal spot lamps adapted for use on vehicles of various kinds, such as automobiles, boats, and the like, and refers more particularly to an improved universal mounting for such lamps and to means for attaching the mounting to a fixed support, as to the post of a windshield frame for automobiles.

The purpose of the invention is to simplify and reduce the cost of universal mountings for spot lamps of this general character, and to the means of attaching the mounting to a fixed support, and to also reduce the weight of the structure and to generally improve the appearance of the lamp as a whole.

The invention consists in the combination and arrangement of the parts shown in the drawings and described in the specification, and is pointed out in the appended claims.

In said drawings:

Figure 1 is a plan view of a universal spot lamp and mounting embodying my improvements.

Figure 2 is a rear view thereof.

Figure 3 is a detail section on the line 3—3 of Figure 1, enlarged.

Figure 4 is a transverse section on the line 4—4 of Figure 3.

Figure 5 is a side elevation of one of the members of the two-part bracket.

Figure 6 is a transverse section on line 6—6 of Figure 5.

Figure 7 is a perspective view of a clamping plate for attaching the fixed bracket member to a support.

Figure 8 is a partial side elevation and partial section showing another method of attaching the fixed bracket to a support.

In said drawings, 7 designates the lamp casing; 8 the front lens thereof, and 9 a hollow stem which extends rearwardly from and affords means by which the lamp casing may be manipulated on its mounting. 10 designates a windshield frame post, or other fixed support, to which the lamp mounting can be fixedly attached.

In the present construction of lamp, the stem 9 is adapted to be made hollow to receive the switch mechanism for controlling the lamp circuit. In such construction the switch mechanism can be controlled by a rocking actuator 11 having a hand piece 12 and adapted for rocking and axial movement in ears 13 that may be formed integral with the stem and a hollow stud 14 also made integral with said stem and which constitutes one of the members of the mounting.

The lamp mounting comprises, in addition to said stud 14, a hollow two-part bracket member or arm 15, a member 16 which is connected to the arm 15 by a hinge joint, designated as a whole by 17 and rotative on a vertical axis, and the stud 14 before mentioned, and between which and the member 16 is formed a joint rotative on the axis of the stud 14. The said mounting permits the lamp to be swung universally about the joint 17 and the joint between the mounting member 16 and the stud 14, so as to thereby enable the casing and the light rays projected therefrom to be universally adjusted in substantially all directions.

The bracket or arm 15 is made of two pieces 18 of sheet metal, and may be of generally semi-cylindric section by swaging operating, and they are adapted to be fastened together, near the post support, by a clamping bolt or rivet 19. The said members of the arm 15 are formed at one end to provide integral, oppositely extending vertical feet 20, 20, which are laterally widened beyond the diameter of the arm, and said feet are centrally swaged at 21 to form recessed seats to bear against the support 10 when the latter is cylindric, as herein shown.

The means shown in Figures 1, 2, 3, 4, and 5 for attaching the bracket arm 15, to a post or other support, are made as follows:

22, 22 designate flexible metal straps that partially embrace the outer side of post 10 at vertically spaced distances apart. The ends of said straps extend inwardly over the side edges of the feet 20, and are turned inwardly to form right angle terminals 24 that lie against the inner sides of stiffened metallic plates 25 (Figures 1, 3, and 7) that lie inside the feet and are generally parallel therewith, said plates having centrally swaged recesses that lie opposite the recesses 21 of said feet. Said plates 25 are provided at their ends with threaded holes 26 to receive clamping screws 27 which loosely extend through openings 28 in the inturned terminals 24 of the straps 22 and engage at their ends the inner faces of said feet 20. The thrust of said clamping screws, threaded to the plates 25, against the feet 20 serve to force said plates outwardly against the inturned terminals 24 of the straps to tightly draw the straps about the posts. The straps can be made to closely fit over posts of different diameters by providing each end thereof with a number of openings 28 for the passage of the screws 27; it being evident that the straps can be made of material sufficiently flexible to enable the ends thereof to be cut off and turned inwardly to bring a set of holes in alignment with the threaded openings of the anchor plates 25 to adapt the attaching means to posts of smaller diameter than that for which the full length straps are adapted. It will be noted that by making the arm 15 of two like parts, to form, when assembled, a tube-like structure 15, flanges or feet 20 of ample length can be formed on the arm members to permit wide vertical bearings of said feet on said post or support. This, taken in connection with two spaced points of support, afforded by the two straps 22, produces a very rigid attachment, and one which is simple to make and assemble, requires a minimum amount of metal, and is attractive.

The arm members 18 are provided at the joint 17 with horizontally rounded, reduced ends 30 which are flattened at their upper and lower sides and form, when assembled, a head 31. The member 16 of the mounting is provided with outwardly extended fork arms 32 which overlap the upper and lower flat faces of said head 31, and the parts are hinged together by a bolt 33 which extends through said arms and through the walls of the head. The bolt is provided with a nut to clamp the parts in place. It will be observed that the hinge bolt 33 serves also the function of clamping the outer or headed ends of the arm members on each other, with their edges in abutting relation, said bolt functioning, with the rivet 19, to rigidly bind said members together to give the arm substantially the strength of a seamless tube member. The two-part construction of the bracket arm 15 greatly simplifies the formation on the complete arm of the feet 20, so as to thereby make it possible by a simple swaging operation to form desirably long feet 20, and thereby increase the spacing of the straps on the post 10 and greatly strengthens the attachment of the arm to said post.

Friction washers or discs 35 are interposed between said fork arms 32 and the flat faces of the head 31 to produce a desired frictional engagement between the parts, which permits the mounting member 16 to be rotated about the axis of the bolt 33 with moderate pressure applied to the stem 9, while preventing accidental derangement of adjustments thus made.

The rotative joint between the mounting member 16 and the stud 14 comprises an insert 36, which may be cast in the stud 14, and extends therebeyond in the form of an exteriorly tapered portion or extension 37. Said outer end of the tubular, tapered extension 37 fits for rotational movement within the outer, externally threaded end of the mounting member 16, said member being inwardly slitted at its screw threaded portion. A nut 38, tapered to oppose the exterior taper of the extension 37, affords means for firmly clamping the joint members together, while permitting rotational movement of the stem 9 and the stud 14 relatively to the member 16 with a moderate applied force.

The said mounting member 16 and stud 14 are tubular to receive the lamp cord 39, which is adapted for connection to a switch mechanism located within the stem 9. As herein shown, the said lamp cord is threaded through two longitudinally spaced openings 41, 42 in the bracket arm 15 and is looped down under the joint 17 and again threaded through an opening 43 in the mounting member 16 on its way to the switch mechanism in the hollow stem 9. In order to avoid tension pull on the cord 39 being exerted on the binding connections by which the cord conductors are connected to the conducting elements of the switch, the said cord is formed inside the opening 43 of the mounting member 16 with an enlargement, such as the knot 44, which is larger than the adjacent opening 43. Therefore, tension pull on the cord is resisted by contact of the enlargement 44 with the wall of the hollow member 16 at said opening 43, as shown in Figure 3.

The same form of bracket arm that is designed to be fixed to the post 10 can be fixed to other kinds of supports, as by means of screws or bolts adapted to extend through an opening or openings 46 in the feet 20, as shown in Figures 4, 6, and 8. As shown in Figure 8, the bracket arm is fixed to a solid support, and the attaching means consist of wood screws 47. If the support be of metal structure, bolts or rivets may take the place of the screws shown.

I claim:

1. A universal spot lamp mounting comprising, in combination, a lamp casing structure provided with a lateral, tapered extension of largest diameter at its free end, a bracket member having means of attachment at one end to a support, an intermediate bracket member having means at one end to hinge it on the free end of the first bracket member to swing in one plane, and slitted at its other end and engaged over said extension and threaded at its slitted portion, and a clamping nut surrounding said slitted, threaded portion of the intermediate member and tapered to frictionally clamp said slitted portion on said tapered extension.

2. A universal spot lamp mounting comprising, in combination with a lamp casing structure having a rearwardly extending stem, of a two-part tubular member having at one end oppositely directed flanges, with vertically spaced means surrounding said respective flanges and the support for clamping them to a support, a member intermediate said stem and the fixed member, means for rotationally mounting said stem on one end of said intermediate member to swing about the axis of said intermediate member, and other means to hinge the other end of said intermediate member to the fixed member to swing on an axis at right angles to the axis of the rotational mounting.

3. A universal spot lamp mounting comprising, in combination with a lamp casing structure having a rearwardly extending hollow stem having a hollow, rigid stud the bore of which communicates with the bore of the stem, of a member having at one end means for fixedly attaching it to a support, and a tubular member intermediate said fixed member and stud and having means at one end to hinge it on said fixed member and being slitted at its other end and rotationally engaging over an extension of said stud on an axis at right angles to said hinge, said stud extension being exteriorly tapered, and a nut threaded to the outer slitted end of the intermediate tubular member and having a taper opposed to the exterior taper of said stud extension.

4. A universal spot lamp mounting comprising a lamp casing structure having a rearwardly extending hollow stem provided with a fixed hollow stud the bore of which communicates with the bore of the stem, and having a terminal, exteriorly tapered extension, a tubular member having a threaded, slitted portion mounted for rotational movement thereon, a nut threaded to the slitted portion of said tubular member and having a taper opposing the taper of said extension, a bracket arm adapted for fixed attachment to a support, and a hinge connection between said bracket arm and said tubular member and swingable on an axis at right angles to the axis of said stud.

5. In a universal lamp mounting, an arm made of two semi-cylindric sheet metal parts provided at one end of the arm with oppositely extending apertured feet to engage a support, vertically spaced clamping straps adapted, at their intermediate parts, to embrace a support, and clamping means cooperating with the ends of said straps and feet to bind them on said support, and a member hinged at one end to said arm to swing in one direction and adapted for rotational connection at its other end with a lamp structure on an axis at an angle to the axis of the said hinge.

6. In a universal lamp mounting, the combination with the members of a universal lamp mounting, of a bracket arm formed of two semi-cylindric parts having oppositely disposed feet adapted to fit against a support, spaced flexible straps adapted to embrace said support and clampingly connected to said feet, and means to swingingly connect one of the members of said lamp mounting to said bracket arm.

7. In a universal lamp mounting, the combination with the members of a universal lamp mounting, of a bracket arm formed of two semi-cylindric parts having oppositely disposed feet adapted to fit against a support, vertically spaced straps adapted to embrace a support and provided with inturned apertured terminals which extend across said feet, rigid plates between said inturned strap terminals and feet, and screws extending through said strap terminals and threaded to said plates to bear on said feet to draw the straps about said support, and means to connect one of said members of the lamp mounting to said two-part bracket arm.

8. In a universal lamp mounting, a bracket arm formed of two semi-cylindric sheet metal members abutting at their edges and having oppositely disposed feet adapted to bear against a support, spaced flexible straps adapted to embrace between their ends said support, clamping means cooperating with the ends of said straps and feet to draw said straps about said support, said arm being formed at its free end with a two-part hinge head perforated for the passage of a hinge member to afford means to connect a lamp mounting thereto and to fasten the two members of the arm together.

9. In a lamp mounting a bracket arm comprising two mating, semi-tubular members abutting at their edges and provided at one end of the arm with oppositely extending feet, flexible straps adapted between their ends to embrace a support, clamping means cooperating with the strap ends and feet to draw the strap about said support, and bolts extending through the members of said two part arm to bind them together, one of said bolts being a hinge bolt to hingedly connect a lamp mounting to said bracket arm.

10. In a lamp mounting, a bracket arm provided at one end with oppositely extending feet, vertically spaced clamping straps adapted to embrace a support, the ends of said strap extending inwardly beyond the side margins of said feet and formed with perforated, inturned terminals, rigid plates between said feet and said inturned terminals, and screws extending through the perforations of said terminals and threaded through said plates and bearing at their ends against said feet.

11. In a lamp mounting, a bracket arm provided at one end of the arm with oppositely extending feet, vertically spaced clamping straps adapted to embrace a support, the ends of said strap extending inwardly beyond the side margins of said feet and formed with perforated, inturned terminals, rigid plates between said feet and said inturned terminals, and screws extending through the perforations of said terminals and threaded through said plates and bearing at their ends against said feet, said straps being each provided with a plurality of openings spaced longitudinally along the strap ends for the passage of said screws to adapt the straps to supports of different diameters.

In witness whereof I claim the foregoing as my invention, I hereunto append my signature this 13 day of June, 1921.

ERNST G. K. ANDERSON.